A. W. JACOBS.
BAIL HOLDER FOR LANTERNS.
APPLICATION FILED AUG. 30, 1915.
1,193,151.
Patented Aug. 1, 1916.
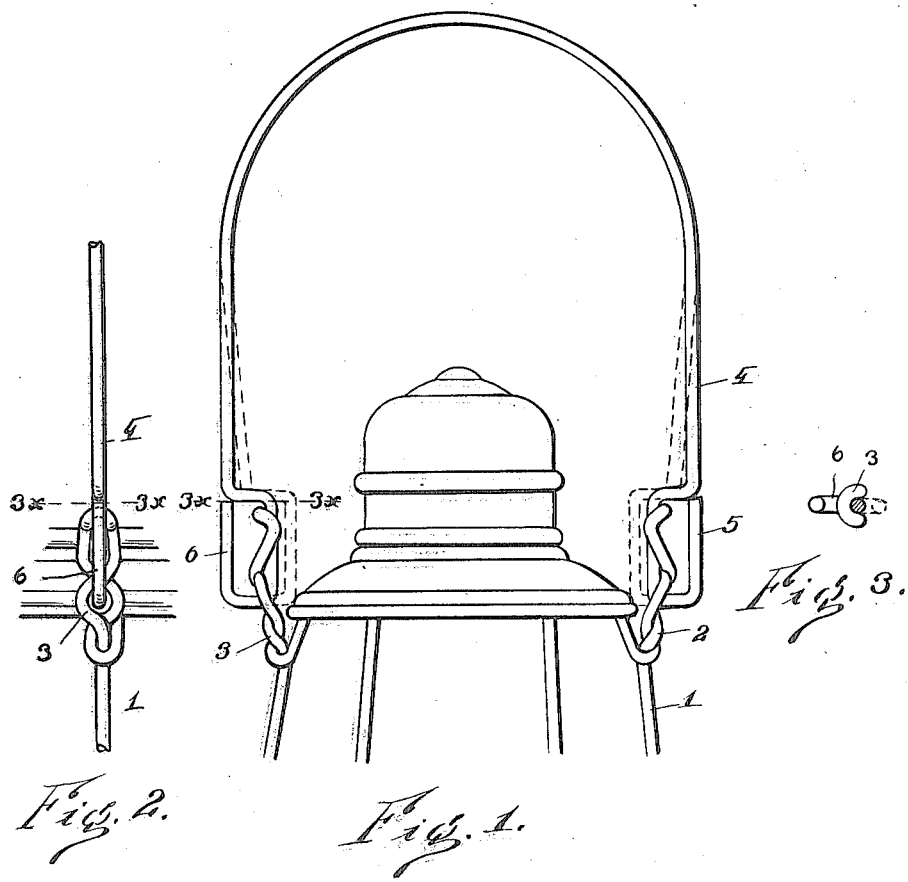
Witnesses
Eric Schinger.
Eleanor M. Corcoran.
Inventor
Albert W. Jacobs
By Frank Keifer
Attorney

UNITED STATES PATENT OFFICE.

ALBERT W. JACOBS, OF ROCHESTER, NEW YORK.

BAIL-HOLDER FOR LANTERNS.

1,193,151. Specification of Letters Patent. Patented Aug. 1, 1916.

Application filed August 30, 1915. Serial No. 48,140.

*To all whom it may concern:*

Be it known that I, ALBERT W. JACOBS, a citizen of the United States, residing at Rochester, in the county of Monroe and State of New York, have invented certain new and useful Improvements in Bail-Holders for Lanterns, of which the following is a specification.

The object of this invention is to provide a new and improved form of bail holder for lanterns for locking the bail in an upright position.

Another object of the invention is to provide a lock that will always hold the handle or bail against swinging when the bail is raised to upright position.

Another object of the invention is to form the bail so that it can be readily released to permit of its being turned down from upright position.

These and other objects of the invention will be fully illustrated in the drawings, described in the specification and pointed out in the claims at the end thereof.

In the drawings, Figure 1 is a front elevation of the lantern, the bottom of the lantern being broken away. Fig. 2 is a side elevation of the bail and one of the bail ears therefor. Fig. 3 is a section through the bail on the line 3×—3× of Figs. 1 and 2.

In the drawings like reference numerals indicate like parts.

In the drawings reference numeral 1 indicates the frame of the lantern formed preferably of wire in which are formed the bail ears 2 and 3. In forming the bail ears the wire is reversely bent upon itself forming two consecutive openings therein like a figure 8.

4 indicates the handle of the lantern having eyes 5 and 6 formed on the bottom thereof.

The bail ears are bowed outwardly at the middle and top and are bent inwardly near the top. The eyes of the bail are preferably rectangular in shape and the wire of the bail eyes goes through the lower opening in each of the bail ears, the bail being thus mounted to swing in the lower openings of the ears. The top of the bail ears forms a seat opening inwardly in which the wire of the bail eye can engage with a lateral movement, the bail being formed so that the bottom thereof will normally swing outwardly into engagement with the seats. While the bail eye is engaged with this seat the bail is held against swinging. By being pressed inwardly the bail can be released from the seat and turned down from a vertical position in either direction, being free to swing on either side of the vertical. From its turned down position it can again be turned up into engagement with the seat in the bail ears and locked in vertical position.

I claim:

1. In a lantern the combination of a bail ear, a seat mounted above said bail ear, a bail mounted to pass through said bail ear and having a sliding engagement therewith and into said seat, said bail being resilient and capable of being pressed inwardly to move said bail out of engagement with said seat and to permit said bail to swing in said bail ears.

2. In a lantern the combination of a bail-ear, said bail ear having the shape of a figure 8 and having two openings therein and being bent out of a single piece of wire, the upper portion of said bail ear being curved inwardly near the top and then outwardly at the top forming a vertically extending seat on the inner side thereof, a bail passing through the lower opening of said bail ear and up into said seat, said bail being held thereby in an upright position.

3. In a lantern the combination of a bail, a rectangular loop on the end of said bail, a bail ear on said lantern, said bail ear being bent to the shape of a figure 8 and having two openings therein, the lower end of said rectangular loop being mounted to swing and slide horizontally in the lower opening of said bail ear, the upper opening of said bail ear being bent to form a longitudinal seat thereon, the inner side of said rectangular loop being adapted to engage with and lock itself in said seat on said bail ear.

In testimony whereof I affix my signature.

ALBERT W. JACOBS.

Copies of this patent may be obtained for five cents each, by addressing the "Commissioner of Patents, Washington, D. C."